United States Patent [19]
Kaji et al.

[11] Patent Number: 5,702,673
[45] Date of Patent: Dec. 30, 1997

[54] OZONE GENERATING APPARATUS

[75] Inventors: Naruhiko Kaji, Yokohama; Yutaka Nakano, Yokkaichi; Rempei Nakata, Kamakura; Minoru Harada, Fujisawa; Ryoichi Shinjo; Manabu Tsujimura, both of Yokohama, all of Japan

[73] Assignees: Ebara Corporation, Tokyo; Kabushiki Kaisha Toshiba, Kawasaki, both of Japan

[21] Appl. No.: 633,551

[22] Filed: Apr. 17, 1996

[30] Foreign Application Priority Data

Apr. 17, 1995 [JP] Japan ................................. 7-115128

[51] Int. Cl.$^6$ .................................................... C01B 13/11
[52] U.S. Cl. ........................... 422/186.07; 422/186.05; 422/186.07; 422/186.12; 422/186.18
[58] Field of Search ................... 422/186.07, 186.12, 422/186.18, 186.05; 423/581

[56] References Cited

U.S. PATENT DOCUMENTS

| | | | |
|---|---|---|---|
| 5,332,555 | 7/1994 | Hosokawa et al. | 422/186.05 |
| 5,370,846 | 12/1994 | Yokomi et al. | 422/186.07 |
| 5,549,874 | 8/1996 | Kamiya et al. | 422/186.04 |

FOREIGN PATENT DOCUMENTS

| | | |
|---|---|---|
| 0 567 114 | 10/1993 | European Pat. Off. |
| 0 698 576 | 2/1996 | European Pat. Off. |
| 55-65368 | 5/1980 | Japan |
| 2-144195 | 6/1990 | Japan |
| 6-272054 | 9/1994 | Japan |
| 90/15018 | 12/1990 | WIPO |

OTHER PUBLICATIONS

Pending U.S. Application Serial No. 08/517,879, Harada et al.

"The Technology of Chromium Oxide Passivation on Stainless Steel Surface", Tadahiro Ohmi et al., 1993.

"Corrosion Resistance of Fluorine Passivation of Metal Surface", Reiko Takahashi et al.

Shigeo Shimizu et al., "The Development of Ozone Oxidization Treatment Method on Electro Chemical Buffing Stainless Steel for Clean System", Technical News published by Hitachi Zosen Corporation, Oct. 1994, vol. 55, No. 3, pp. 61–66 (including English Abstract).

Database WPI, Week 7812, Derwent Publications Ltd., London, GB; AN 78-22956, XP002006232 & JP-A-53 015 289 (Mitsubishi Electrtic Corp.), 10 Feb. 1978, Abstract.

Primary Examiner—Charles T. Jordan
Assistant Examiner—Daniel Jenkins
Attorney, Agent, or Firm—Wenderoth, Lind & Ponack

[57] ABSTRACT

An ozone generating apparatus produces highly pure ozone gas which can be used in a semiconductor manufacturing process. The ozone generating apparatus comprises a high voltage source, an ozone generating cell which generates ozone gas by supplying a material gas while applying a high voltage from the high voltage source, and a passage for delivering the generated ozone gas from the ozone generating cell to a desired location. The passage comprises a material which has a passivation film formed by a passivation treatment in a dry process. The oxide passivation film comprises chromium oxide film, iron oxide film or a composite film of chromium oxide and iron oxide.

4 Claims, 3 Drawing Sheets

OZONE GENERATING APPARATUS

BACKGROUND OF THE INVENTION

1. Field of the Invention

The present invention relates to an ozone generating apparatus for producing highly pure ozone gas which can be used in a process such as a semiconductor manufacturing process.

2. Description of the Related Art

Ozone generating apparatuses for producing highly pure ozone gas have conventionally employed stainless steel as the material for the portions of the apparatus which come in contact with the generated ozone gas. In the case of semiconductor manufacturing processes which are highly sensitive to the generation of particles or gases, stainless steel which has been treated by an electrolytic polishing has been used. As ozone generating apparatuses, there have heretofore been apparatuses which utilize electric discharge. In the case of using highly pure oxygen gas as material gas, concentration of ozone is lowered gradually. In order to prevent such lowering of the the concentration of ozone, a small amount of nitrogen gas is mixed with oxygen gas.

When stainless steel is employed as the material for the portions of the apparatus which come in contact with the ozone gas, the generated ozone gas contains a trace amount of chromium (Cr) compounds. It is considered that these chromium compounds are generated in the following manner. Namely, when oxygen gas ($O_2$) to which nitrogen gas ($N_2$) has been added is employed as the material gas, NOx (nitrogen oxides) is generated from the nitrogen gas in the ozone generating cell. The $NO_X$ reacts with an extremely trace amount of moisture which has been adsorbed by the surface of the stainless steel to form nitric acid. It is considered that this nitric acid then reacts with the stainless steel to form Cr compounds. Further, while the amount of Cr compounds will decline with time if a continuous flow of ozone gas is provided, the amount of time required to reduce the amount of Cr compounds to a level which is not problematic from a practical standpoint is considerable in the case of regular stainless steel or stainless steel which has been treated by electrolytic polishing.

Further, even if the Cr compounds are reduced once, they may again be generated when the stainless steel comes in contact with the atmosphere during an inspection or overhauling of the pipelines. Thus, a lengthy preparatory operation must be carried out to reduce the Cr compounds. Moreover, $SO_X$ (sulfur oxide) or hydrogen fluoride (HF) may be generated in the case where carbon tetrafluoride ($CF_4$), sulfur hexafluoride ($SF_6$), or nitrogen trifluoride ($NF_3$) is added to oxygen gas, resulting in generating Cr compounds.

Contamination of ozone gas by a trace amount of Cr compounds has not caused a problem in semiconductor manufacturing processes in which ozone gas has been employed. As the applications for ozone gas have grown, the Cr compounds in the ozone gas used in the semiconductor manufacturing process have become a problem, however, there has not been an effective means of solution.

SUMMARY OF THE INVENTION

It is therefore an object of the present invention to provide an ozone generating apparatus which can greatly reduce the amount of Cr compounds in the ozone gas in a short period of time.

According to the present invention, there is provided an ozone generating apparatus comprising: a high voltage source; an ozone generating cell which generates ozone gas by supplying a material gas while applying a high voltage from the high voltage source; and a passage for delivering the generated ozone gas from the ozone generating cell to a desired location, the passage comprising a material having a passivation film formed by a passivation treatment in a dry process.

The material for the passage may comprise stainless steel, and the oxide passivation film may comprise chromium oxide film, iron oxide film or a composite film of chromium oxide and iron oxide.

Further, a material employing a combination of stainless steel and another material such as Teflon which does not contain Cr may also be used without altering the efficacy of the apparatus of the present invention.

As explained above, moisture adsorbed by the surface of the pipe arrangement or contained in the surface layer is considered to be the cause of generation of Cr compounds. In the case of electrolytically polished stainless steel, because the electrolytic polishing treatment is a wet process, moisture is contained in the naturally grown oxide film layer on the surface and in the base metal underneath this oxide film layer. Further, because the conventional passivation treatment using a nitric acid solution is also a wet process, moisture is contained in the surface of the pipe arrangement, thus requiring a lengthy purge with ozone gas for its removal.

In contrast, in the case of a material having a passivation film formed by a passivation treatment in a dry process, the amount of moisture contained in the film is extremely small, and the moisture adsorbed by the surface can be easily removed through purging because of its low activity energy.

According to the present invention, the passage of the ozone gas delivery route from the ozone generating cell which comes in contact with the ozone gas comprises stainless steel which has a passivation film formed by a passivation treatment in a dry process. Therefore, the generation of Cr compounds along the ozone gas delivery route can be greatly reduced in a short period of time.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENTS

An ozone generating apparatus according to an embodiment of the present invention will be described below in detail with reference to FIGS. 1 through 3.

Figure 1:
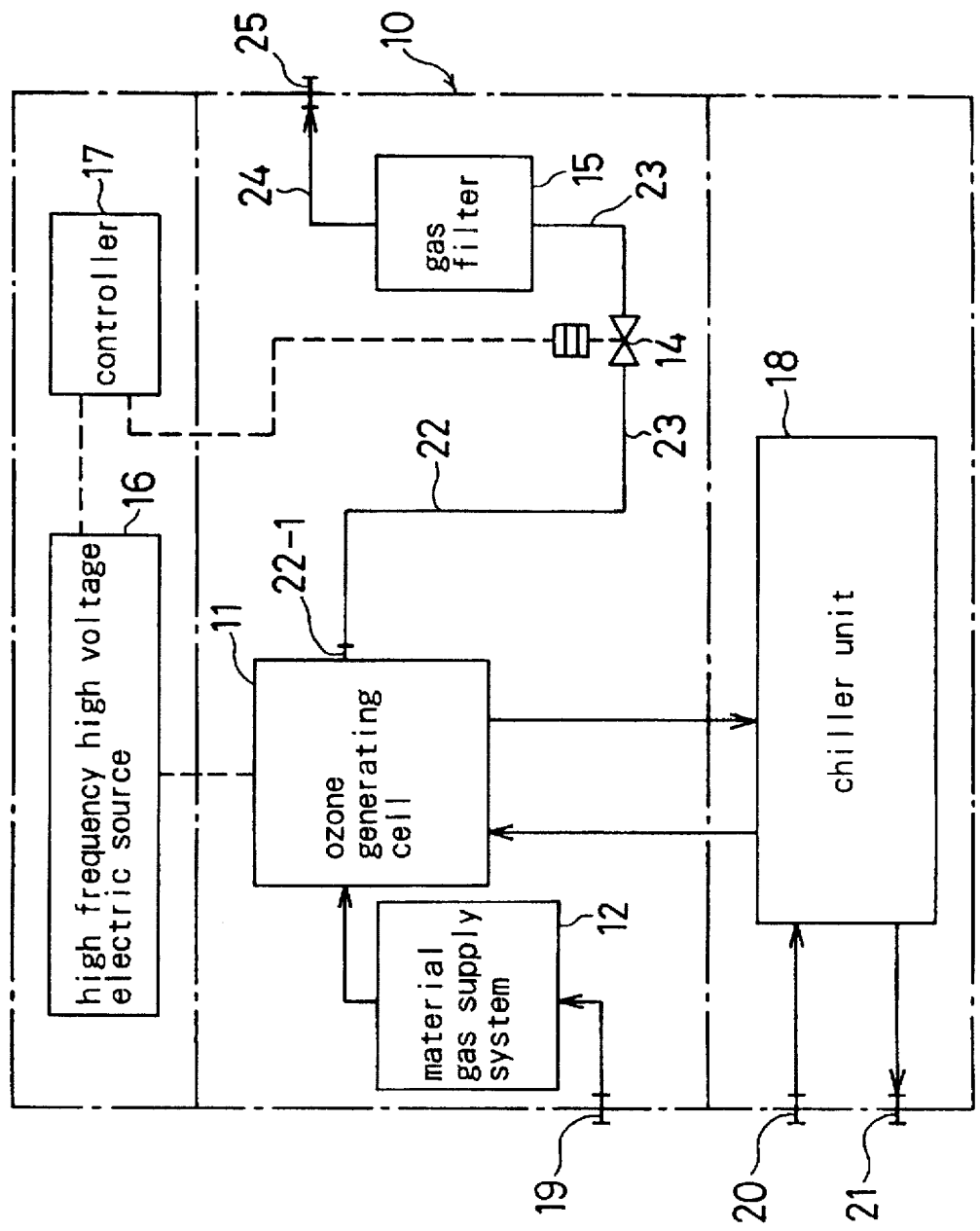
FIG. 1 is a schematic view of an ozone generating apparatus according to an embodiment of the present invention.

FIG. 1 shows an entire structure of the ozone generating apparatus. As shown in FIG. 1, an ozone generating apparatus 10 comprises an ozone generating cell 11, a material gas supply system 12, a gas filter 15, a high frequency high voltage electric source 16, a controller 17 and a chiller unit 18.

The ozone generating cell 11 has a cell or a plurality of cells therein. Each of the cells is connected to a pressure regulating valve 14 by a pipe 22. The pressure regulating valve 14 is connected to the gas filter 15 by a pipe 23. The gas filter 15 is connected to an ozone gas outlet 25 by a pipe 24. Further, a coupler 22-1 is provided between the ozone generating cell 11 and the pipe 22. The pipe 22, the coupler 22-1, the pressure regulating valve 14, the pipe 23, the gas filter 15 and the pipe 24 constitute a passage of an ozone gas delivery route for delivering ozone gas generated in the ozone generating cell 11 to a desired location. The passage which comes in contact with the ozone gas comprises stainless steel which has a passivation film formed by a passivation treatment in a dry process.

The material gas supply system 12 supplies material gas supplied from a material gas inlet 19 to the ozone generating cell 11 at a constant flow rate. Further, the high frequency high voltage electric source 16 serves to apply a high frequency high voltage to electrodes in the ozone generating cell 11 under the control of the controller 17. The pressure regulating valve 14 serves to regulate the pressure in the ozone generating cell 11 to a predetermined value under the control of the controller 17. The gas filter 15 serves to remove particles which are contained in the ozone gas supplied from the ozone generating cell 11.

Deionized water for cooling the ozone generating cell 11 is circulated between the chiller unit 18 and the ozone generating cell 11. Cooling water flows in from a cooling water inlet 20 and flows out from a cooling water outlet 21. The chiller unit 18 is designed so that the deionized water is cooled by the cooling water and supplied to the ozone generating cell 11. As a result, the heat generated by electric discharges such as silent discharges which occur in the ozone generating cell 11 is removed.

In the ozone generating apparatus thus constructed, a high frequency high voltage is applied to the ozone generating cell 11 by the high frequency high voltage electric source 16 under the control of controller 17, and material gas is supplied to the ozone generating cell 11 from the material gas supply system 12.

The ozone gas generated in the ozone generating cell 11 passes through the pipe 22, and flows into the gas filter 15 via the pressure regulating valve 14. Particles or the like contained in the ozone gas are removed by the gas filter 15. Thereafter, the ozone gas passes through the pipe 24 and the ozone gas outlet 25, and is supplied to a particular utilization process such as the semiconductor manufacturing process.

The passage in the downstream side of the ozone generating cell 11, consisting of the pipe 22, the coupler 22-1, the pressure regulating valve 14, the pipe 23, the gas filter 15 and the pipe 24, which comes in contact with the ozone gas comprises stainless steel having a passivation film formed by a passivation treatment in a dry process. If the ozone gas generated in the ozone generating cell 11 does not contain Cr compounds, then the Cr compounds discharged from the ozone gas outlet 25 can be greatly reduced in a short period of time. Thus, the ozone gas which is not contaminated by Cr compounds can be delivered to the process such as the semiconductor manufacturing process.

In the case where the pipe 22, the coupler 22-1, the pressure regulating valve 14, the pipe 23, the gas filter 15 and the pipe 24 in the ozone generating apparatus 10 comprises the materials described below, the amount of Cr compounds in the ozone gas discharged from the ozone gas outlet 25 was equal to or less than $1\times10^{10}$ atms/cm$^2$ as measured by the method described below.

Structural Material

The coupler 22-1, the pressure regulating valve 14, the pipes 22, 23, 24 and the casing of the gas filter 15 are made of stainless steel (SUS 316) which has a passivation film formed by a passivation treatment in a dry state. The interior of the gas filter is made of Teflon (PTFE and/or PFA).

As a passivation treatment in a dry process, there is a method in which electrolytically polished SUS 316L is baked at a high temperature in an inert gas environment, and then oxidized with highly concentrated ozone gas, thereby forming a passivation film of chromium and iron oxides on the surface of the stainless steel. There is also a method, commonly known as the CRP or dry gold method, in which electrolytically polished SUS 316L is baked at a high temperature in an inert gas environment in the same way as the above, and then oxidized with an oxidizing gas, thereby forming a passivation film of chromium oxide or a composite passivation film of chromium and iron oxides. In the oxide passivation films obtained by the above methods, the amount of moisture contained in the film and in the base metal underneath the film is extremely small.

Figure 2:
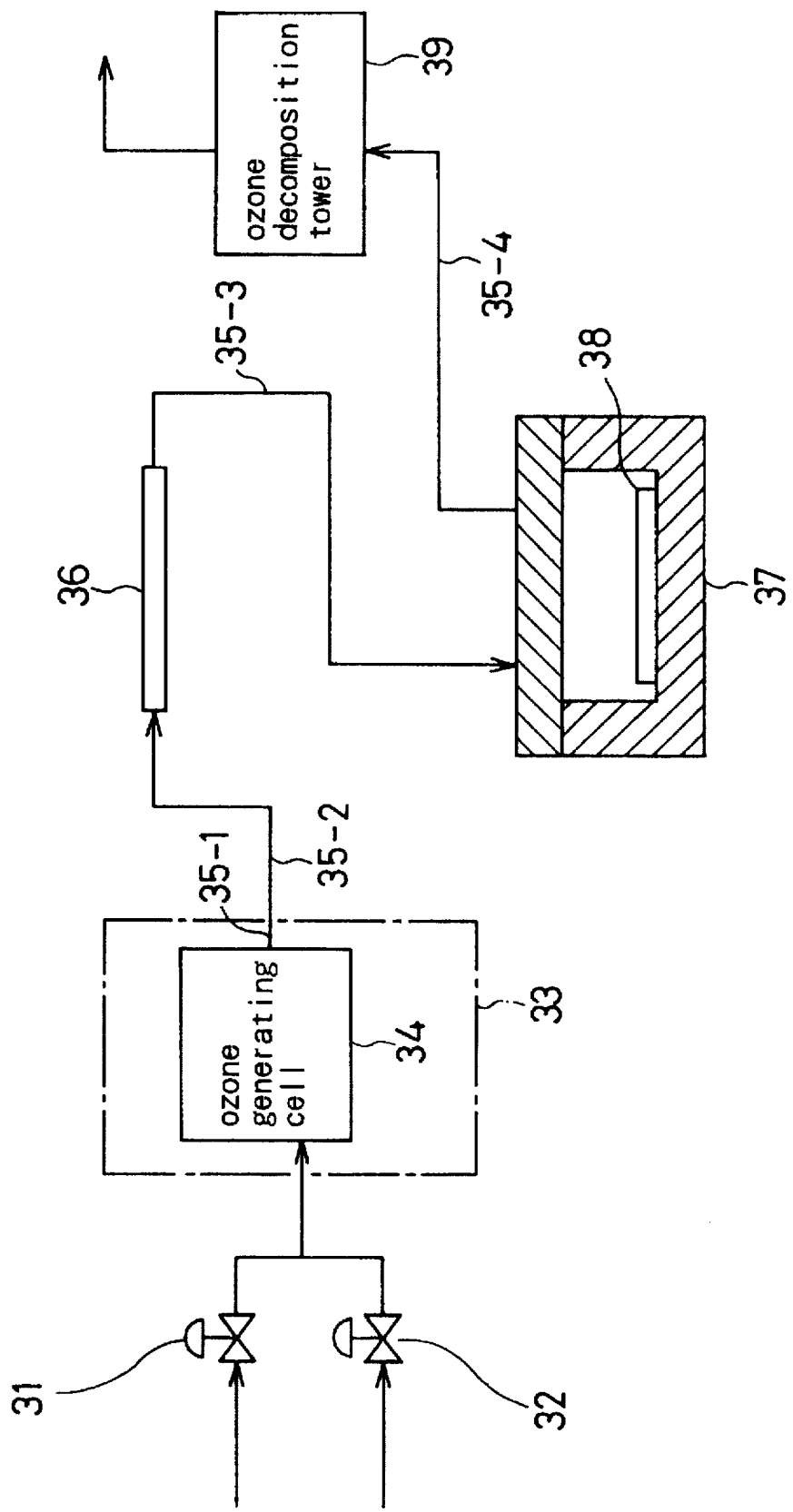
FIG. 2 is a schematic view of an apparatus for measuring the amount of Cr contamination.

FIG. 2 shows an apparatus for measuring the amount of Cr contamination in cases where different materials are employed in the passage in the downstream side of the ozone generating cell. In FIG. 2, an ozone generating apparatus 33 incorporating an ozone generating cell 34 is provided. Oxygen and nitrogen gases are supplied to the ozone generating cell 34, having electrodes to which a high frequency high voltage is applied, at a constant flow rate from an oxygen gas mass flow controller 31 and a nitrogen gas mass flow controller 32, respectively. The ozone gas generated by the ozone generating cell 34 is introduced into a chamber 37 made of Teflon via Teflon pipes 35-1,35-2, a sample pipe 36 and a Teflon pipe 35-3. The ozone gas in the chamber 37 is then discharged through a Teflon pipe 35-4 and an ozone decomposition tower 39.

A silicon wafer 38 is placed in the chamber 37. Cr compounds attached to the surface of the silicon wafer 38 are analyzed by total reflectance fluorescent X-ray spectroscopy (not shown) to measure the amount of Cr contamination. The Cr contamination was measured under the following conditions.

Figure 3:
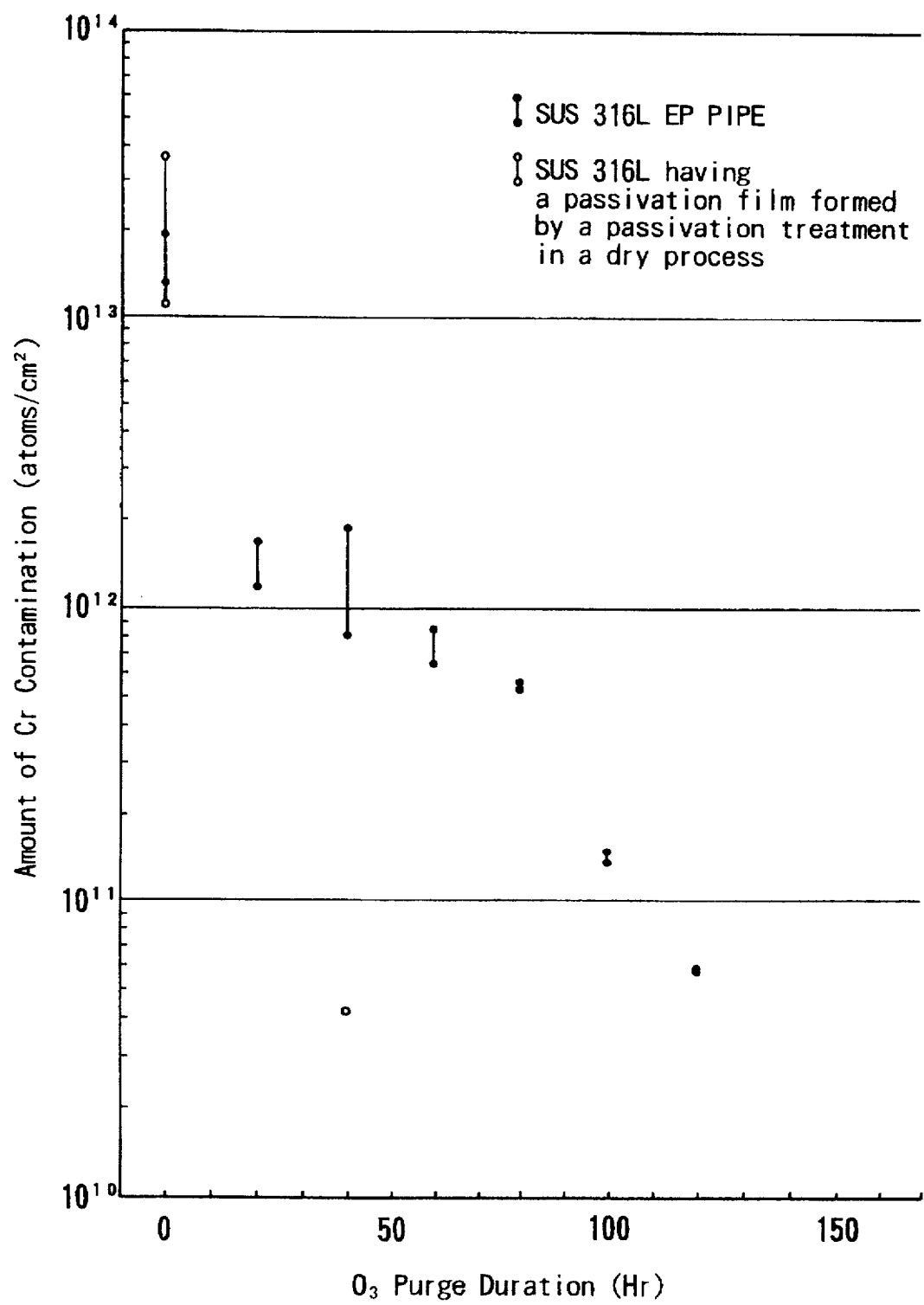
FIG. 3 is a graph showing the results of measuring the amount of Cr contamination.

Testing Conditions ozone gas concentration: 8 vol %
flow rate of material gas: 10 Nl/min pressure in the ozone generating cell: atmospheric pressure
material gas: oxygen containing 0.8 vol % nitrogen
purity of material gas: 99.9995% for both $O_2$ and $N_2$
ozone gas supplying duration: 10 min
diameter of silicon wafer 38: 6 inches Test Results The test results are shown in the graph of FIG. 3. In the case of ordinary SUS 316L EP pipe (electrolytically polished SUS 316L pipe), 120 hours were required to reduce the level of Cr contamination to the order of $1\times10^{10}$ atms/cm$^2$. In contrast, only 40 hours were required to reduce the level of Cr contamination to the same order of $1\times10^{10}$ atms/cm$^2$ in the case where SUS 316L which has a passivation film formed by a passivation treatment in a dry process was employed.

Further, oxygen gas to which nitrogen gas is added, or oxygen gas to which $NO_x$ such as NO, $NO_2$ or $N_2O_5$ is added may be used as the material gas. Also, oxygen gas to which one or more of $F_2$, $SF_6$, $CF_6$ and $NF_3$ is added may be used as the material gas.

By using stainless steel which has a passivation film formed by a passivation treatment in a dry process for the material of the passage which extends from the ozone gas outlet 25 to the process where the ozone gas generated by the ozone gas generating apparatus 10 is utilized, it is of course possible to reduce the amount of Cr compounds greatly in a short period of time.

It should be noted that FIG. 1 shows a structural example of the ozone generating apparatus of the present invention, but any other type of ozone generating apparatus may be used. The essence of the present invention is that the stainless steel which has a passivation film formed by a passivation treatment in a dry process is used for at least the passage of the ozone gas delivery route that comes in contact with the ozone gas supplied from the ozone generating cell in which highly pure ozone gas is generated. Accordingly, the ozone generating mechanism may of course have any type of structure.

As is apparent from the above description, according to the present invention, the stainless steel which has a passivation film formed by a passivation treatment in a dry process is used for at least the passage of the ozone delivery route which comes in contact with the ozone gas. As a result, the Cr compounds along the passage of the ozone delivery route from the ozone generating cell to a desired location such as a semiconductor manufacturing apparatus can be greatly reduced in a short period of time.

Although a certain preferred embodiment of the present invention has been shown and described in detail, it should be understood that various changes and modifications may be made therein without departing from the scope of the appended claims.

What is claimed is:

1. An ozone generating apparatus comprising:

a high voltage source;

an ozone generating cell which generates ozone gas by supplying a material gas comprising oxygen gas to which a small amount of nitrogen gas is added while applying a high voltage from said high voltage source; and a passage for delivering the generated ozone gas from said ozone generating cell to a desired location, said passage comprising stainless steel having a passivation film comprising one of chromium oxide film, iron oxide film and a composite film of chromium oxide and iron oxide formed by a passivation treatment in a dry process.

2. An ozone generating apparatus according to claim 1, wherein said stainless steel comprises electrolytically polished stainless steel.

3. An ozone generating apparatus according to claim 2, wherein said passivation treatment is performed by baking said electrolytically polished stainless steel at a high temperature in an inert gas environment, and oxidizing the thus baked stainless steel with highly concentrated ozone gas.

4. An ozone generating apparatus according to claim 2, wherein said passivation treatment is performed by baking said electrolytically polished stainless steel at a high temperature in an inert gas environment, and oxidizing the thus baked stainless steel with an oxidizing gas.

* * * * *